A. C. BUSBY.
HOBBY HORSE.
APPLICATION FILED JAN. 26, 1918.
1,266,400. Patented May 14, 1918.
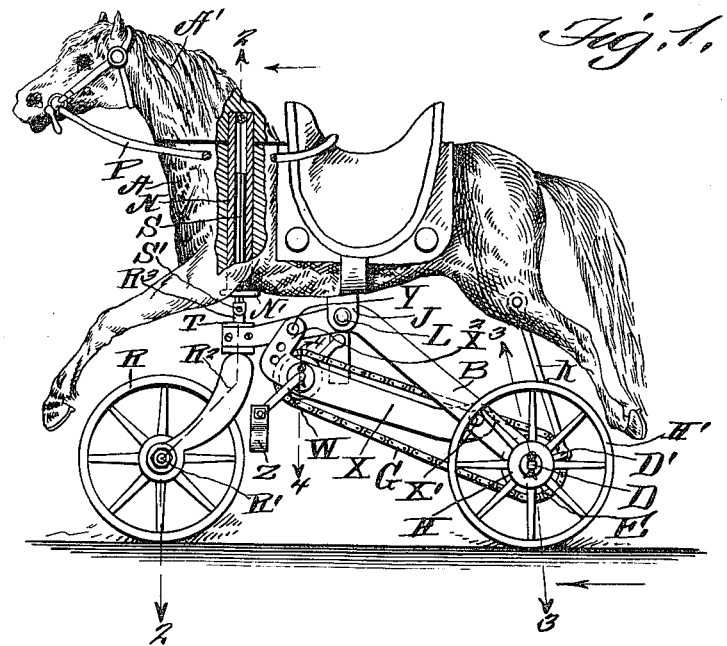
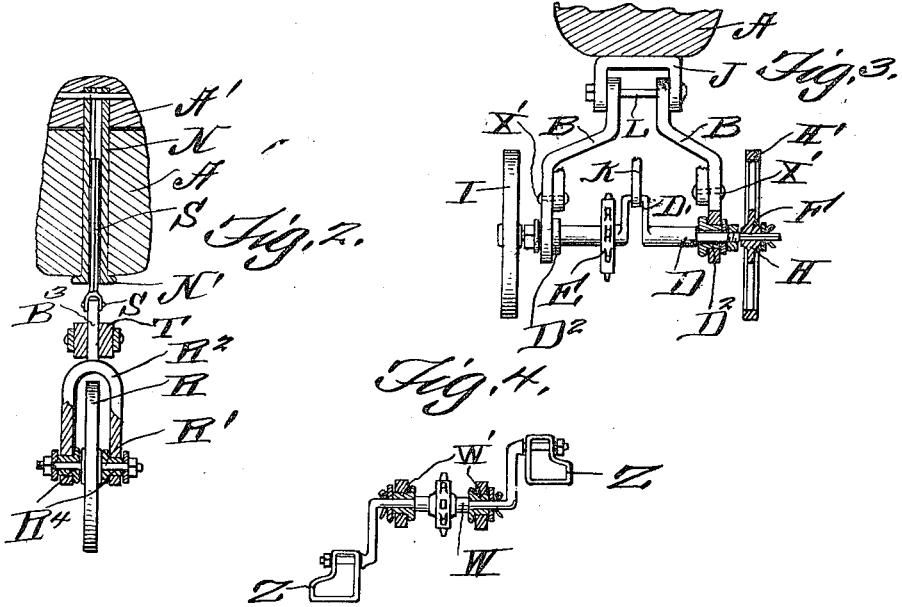
Witnesses
Inventor
A. C. Busby,
By Frankle N. Hugh
Attorneys

UNITED STATES PATENT OFFICE.

ALVIN C. BUSBY, OF ELLENSBURG, WASHINGTON.

HOBBY-HORSE.

1,266,400.  Specification of Letters Patent.  Patented May 14, 1918.

Application filed January 26, 1918.  Serial No. 213,962.

*To all whom it may concern:*

Be it known that ALVIN C. BUSBY, a citizen of the United States, residing at Ellensburg, in the county of Kittitas and State of Washington, has invented certain new and useful Improvements in Hobby-Horses; and he does hereby declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to new and useful improvements in hobby horses and consists of a simple and efficient device of this nature having various details of construction, combinations and arrangements of parts which will be hereinafter fully described, shown in the accompanying drawings and then specifically defined in the appended claim.

I illustrate my invention in the accompanying drawings which, with the letters of reference marked thereon, form a part of this specification and in which:

Figure 1 is a side elevation showing a hobby horse made in accordance with my invention.

Fig. 2 is a vertical central sectional view through the horse, on line 2—2 of Fig. 1.

Fig. 3 is a rear elevation, on line 3—3 of Fig. 1, and

Fig. 4 is a sectional view vertically through the driving wheel and axle upon which the same is mounted.

Reference now being had to the details of the drawings by letter:

A designates the body of the horse and B are two angled brace bars, the lower ends of which are apertured to receive the driving axle D, which latter has a crank D' formed therein and also carries a sprocket wheel E. One end of said axle is squared as at F and adapted to engage the squared outlined opening in the hub H of the wheel H', the other wheel I being journaled upon the axle. A rod K is pivoted at its lower end to said crank and its upper end is pivotally connected to the rear portion of the horse, as shown, and is provided for the purpose of giving the horse a loping motion.

A clevis-shaped plate J is fastened to the under side of the horse and carries a pivotal rod L to which said bars are pivoted at the angled portions thereof. The head A' of the horse is separate from the body portion, and N is a sleeve which is fixed at its upper end in a recess formed in the neck of the head, and its ends are flanged as at N' and has a squared outlined opening therein.

The front or steering wheel is designated by letter R and is pivotally mounted upon the pin R' carried by the forked steering head $R^2$, the latter having a cylindrical shank portion $R^3$ which is swiveled in a block T which is fastened between the forward ends of the angled bars B, and S is a bar squared in cross section engaging the squared outlined opening in said sleeve in which it has a vertical play and is adapted to turn therewith. The forked end is pivotally connected through the medium of the pin S' with the swiveled shank portion of the steering head.

Bars X are fastened at X' to the angled bars B and have their forward ends $X^2$ upwardly turned and are adjustably connected to the screw Y which passes through the two bars B and forming means for raising and lowering the forward ends of the bars X, in order to adapt the hobby horse to different lengths of legs of riders. A crank shaft W is journaled in oppositely disposed apertures in the bars X, and stirrups Z are connected to each end of the crank shaft forming means for rotating the same. A sprocket wheel is mounted upon the shaft carrying said stirrups and intermediate the bars X, and is connected by a sprocket chain G with the sprocket wheel upon the driving axle.

Suitable steering reins P of strap iron, or other material, are fastened to the head for turning the same in either direction and with it the steering wheel.

From the foregoing it will be noted that by the provision of a hobby horse made in accordance with my invention the device may be ridden by children of different sizes with different lengths of legs, the horse being propelled by the crank shaft while the steering is effected by the turning of the horse which imparts a similar movement to the steering wheel.

What I claim to be new is:

A hobby horse comprising a body portion, angled bars pivoted to the underside of the horse, and driving shaft axle journaled between said angled bars, a rod pivoted to the crank portion of the axle at its lower end and its upper end fastened to the horse, a detachable head upon the horse, a sleeve fastened to the neck of the head and swiveled in an opening in the body of the horse, a steering head swiveled between the forward ends of the bars in which the driving axle is journaled, and means fastened to the steering head and having a longitudinal movement in and rotating with said sleeve, adjustable bars pivoted at their lower ends to said angled bars and their other ends being upwardly turned and perforated and adjustably connected to the angled bars, a pedal crank shaft journaled in the adjustable bars, and sprocket and chain connections between the driving axle and said pedal shaft, the steering head having a shank portion, a block between the angled bars in which said shank portion is swiveled.

In testimony whereof I hereunto affix my signature in presence of two witnesses.

ALVIN C. BUSBY.

Witnesses:
  JOHN EDWARDS,
  JESSE GOODWIN.